Jan. 13, 1925.

O. SCHWIMMER 1,523,351

CONTROL MECHANISM FOR INSTANT ACTION

Filed May 3, 1923    2 Sheets-Sheet 1

INVENTOR
Oscar Schwimmer
ATTORNEYS

Jan. 13, 1925.　　　　　　　　　　　　　　　1,523,351
O. SCHWIMMER
CONTROL MECHANISM FOR INSTANT ACTION
Filed May 3, 1923　　　　2 Sheets-Sheet 2
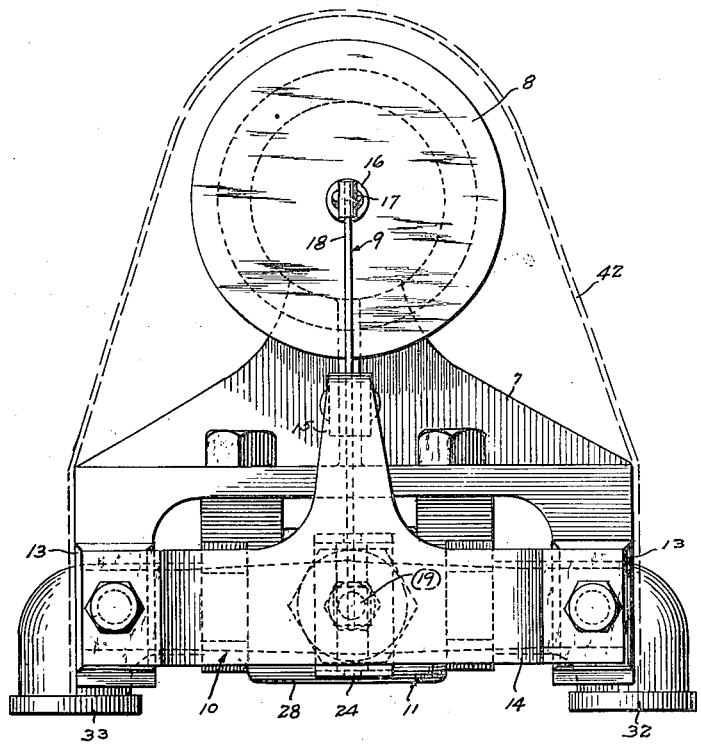
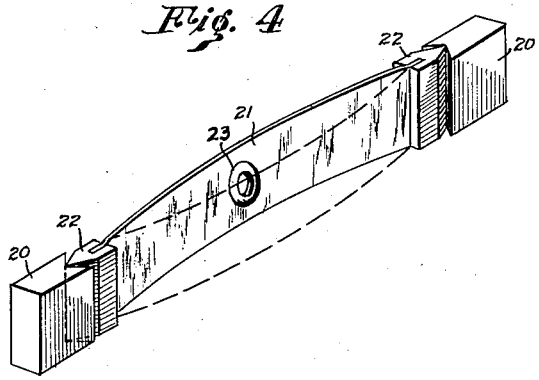
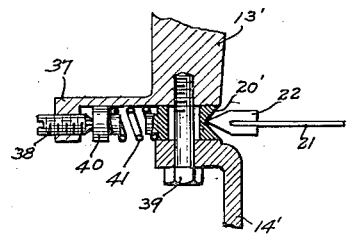
INVENTOR
Oscar Schwimmer
BY
ATTORNEYS Patented Jan. 13, 1925.

1,523,351

UNITED STATES PATENT OFFICE.

OSCAR SCHWIMMER, OF LOS ANGELES, CALIFORNIA.

CONTROL MECHANISM FOR INSTANT ACTION.

Application filed May 3, 1923. Serial No. 636,445.

*To all whom it may concern:*

Be it known that I, OSCAR SCHWIMMER, a citizen of the United States, and resident of Los Angeles, in the county of Los Angeles and State of California, have invented new and useful Improvements in a Control Mechanism for Instant Action, of which the following is a specification.

This invention relates broadly to a mechanical movement, wherein a device to be actuated or controlled is moved at the limits of travel of an actuating member having a lost motion connection therewith, the actuated member having a quick movement of comparatively large range. This invention may be applied to many devices. Herein, it is shown as applied to a thermostatic control for a fluid fuel supply, such as gas, to a water heater. In such a combination, the heat of the water in a tank will actuate a fuel valve to control the supply of fuel to the burner, so that the valve is opened upon a minimum temperature being reached and closed upon a maximum temperature being reached. This invention is especially adaptable for storage heaters, wherein water is automatically heated to maintain a storage tank full of water of a given temperature.

The objects of this invention are first, to provide a device of the character described having novel snap-over means to operate a controlled device, said snap-over means being connected to the actuating means by a lost motion connection; second, to provide a device of the character specified having an adjustable lost motion connection; third, to provide a compact, simple, durable structure of the character described; and fourth, to provide the combination of a thermostat and valve positively connected without the intervention of multiplying levers and like mechanism, and having no neutral points or dead centers.

Figure 1:
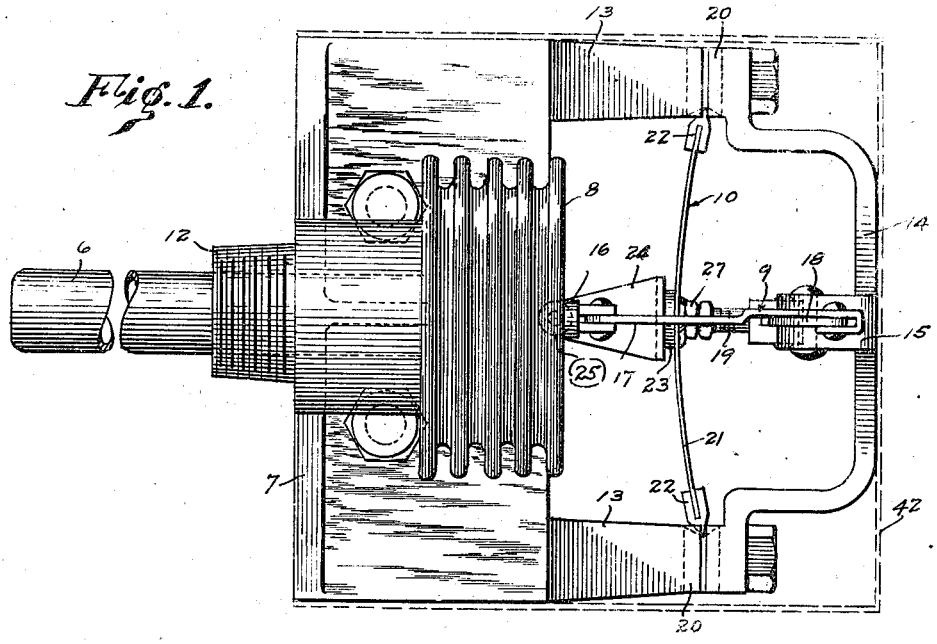
Figure 2:
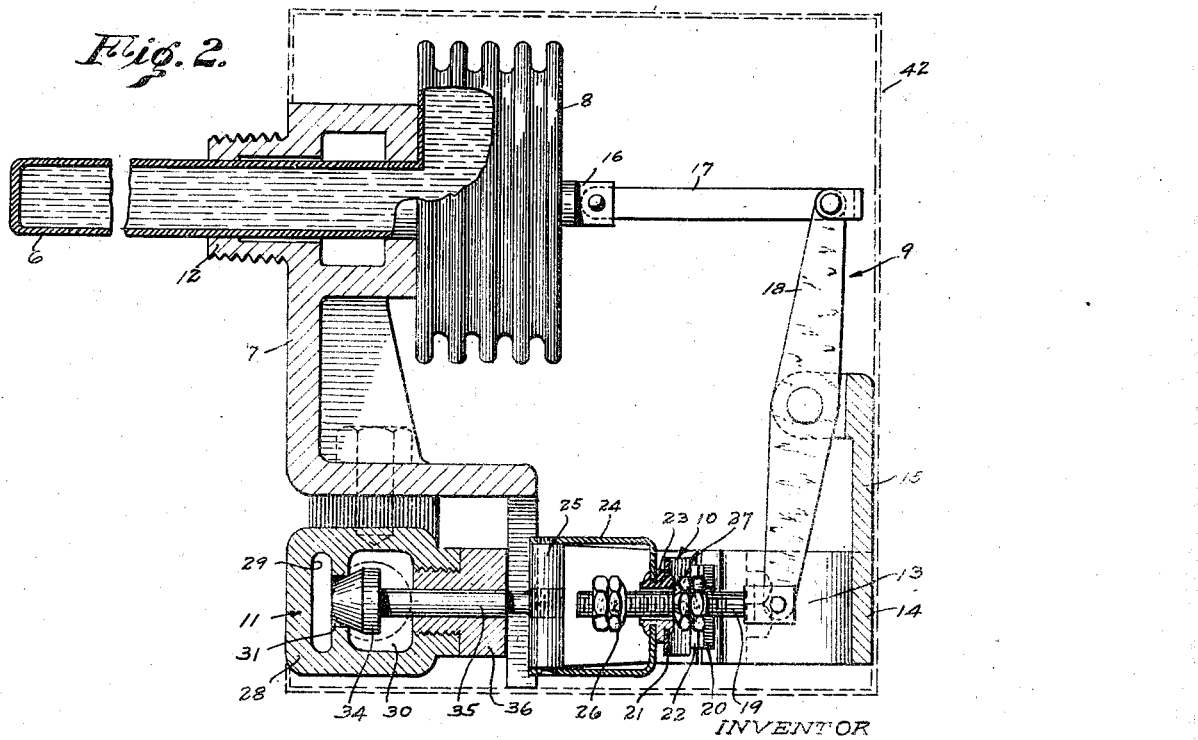

These objects together with other objects and corresponding accomplishments are obtained by means of the embodiment of my invention illustrated in the accompanying drawing, in which:

Fig. 1 is a plan view of the preferred form of control; Fig. 2 is a side elevation of the structure shown in Fig. 1, the thermostat being shown partly in section, and a housing for the instrument being shown in dotted lines; Fig. 3 is a front elevation of the control, the housing being shown in dotted lines; Fig. 4 is a perspective view of the snap-over spring and its mounting; and Fig. 5 is a horizontal section through a modified form of mounting.

Referring more particularly to the drawings, a bulb consisting of a closed tubular member is indicated by 6. The bulb is mounted in a base casing 7 and is connected to a bellows diaphragm 8. Transmitting linkage 9 connects the bellows to a snap-over device indicated generally by 10. The snap-over device is connected to a gas valve indicated generally by 11. The bellows 8 is of a yielding metal so that it may expand in an axial direction. The bulb and bellows contain a liquid preferably of low boiling point so that it will form a vapor under rising temperature and liquify through decreasing temperatures within the range of the temperatures at which the boiler is to be operated. This fluid or medium may be changed according to the range of desired temperature control. A suitable liquid is alcohol.

The base casting 7 is formed with a boiler fitting 12. Extending forwardly of the base are pillars 13, to the forward ends of which is bolted a yoke 14. The yoke has a bracket 15 upstanding therefrom. This bracket is provided with parallel ears for pivotally supporting a lever.

Secured to the outer plate of the bellows is a stem 16. The stem has a bifurcated end and pivotally secured thereto is a connecting link 17. Pivotally mounted between the ears on bracket 15 is a lever 18, the upper end thereof being pivotally secured to the connecting link 17. Pivotally secured to the lower end of the lever 18 is a threaded rod 19.

Clamped between the yoke 14 and the pillars 13 are knife edge bearing blocks 20. A leaf spring 21 has knife edges 22 secured to the ends thereof, and the whole is mounted between the bearing blocks 20 so that the spring is bowed. An aperture is formed at the center of the spring and secured therein is a bushing 23. Secured to the bushing is a yoke 24, the bushing serving to connect the yoke and the spring. A swivel pin 25 is mounted between the arms of the yoke and serves to secure the stem to the gas valve. The rod 19 is slidably mounted in the bushing 23, and mounted upon the rod is a valve release nut 26, which may be held in adjusted position by a jam nut. A temperature adjusting nut 27 is mounted upon the other side of the bushing and may be secured in position by a jam nut.

Bolted to the base casing is a valve housing 28 provided with a chamber 29 separated from a chamber 30 by a wall having a valve port 31 therein. Chamber 30 communicates with a gas intake 32, and chamber 31 communicates with a gas outlet 33. A conical valve 34 controls the port 31 and is provided with a stem 35 passing through a gas tight valve stem bushing 36. The stem 35 is secured to the pin 25.

Assume that the parts are in the position shown in the drawing. The leaf spring is bowed with its center toward the gas valve and the temperature adjusting nut 27 rests against the bushing 23. The position of the spring is such that the valve 34 rests upon its seat closing the port 31 and thereby shutting off the supply of gas to the burner. Cooling of the water in the tank due to withdrawal of hot water, radiation of heat, or for any other reason causes the liquid in the bulb and bellows to contract. This contracts the bellows and pulls the connecting link 17 inwardly to rock the lever 18. Rod 19 slides through the bushing until the valve release nut 26 engages the bushing. Continued contraction of the bellows causes the rod 19 to pull the bowed spring to its center position, and at the instant that it moves over center, the spring snaps so as to bow in the opposite direction thereby fully opening the valve 34. Gas is supplied to the burner and the water in the tank is heated.

The bellows then begin to expand causing the temperature adjusting nut 27 to engage the spring and move it to over center position, whereupon the valve snaps closed. It is obvious that the temperature at which the valve is opened may be varied by moving the nut 26 along the rod 19. The temperature at which the valve is closed is determined by the position of the nut 27.

In Fig. 5, a modified form of knife edge bearing block is shown. The pillar 13' corresponds to pillar 13 and has an extension 37 provided with a threaded opening in which is an adjusting screw 38. Yoke 14' corresponding to yoke 14 is secured to pillar 13' by means of a bolt 39 so that the knife edge bearing block 20' may slide between the pillar and the yoke. An elongated slot is provided in the block 20', through which the bolt 39 passes so as to permit sliding movement. Screw 38 engages a head 40, against which bears a compression spring 41. The compression spring is disposed between the bearing block 20' and the head 40, bosses on the latter maintaining the spring in position. Both bearing blocks may be constructed in the manner just described. It is obvious that by adjusting the screw 38 the strain upon the spring 21 may be varied. The action of the spring may thus be adjusted.

In mounting the device upon a boiler, a loop is formed in the gas supply line, the intake pipe being secured to intake 32 and the pipe leading to the gas burner being secured to the gas outlet 33. It is obvious that with the construction shown the gas pipes may be positioned close to the wall of the boiler. The entire mechanism may be housed by a cover 42 indicated in the drawings by a dotted line.

What I claim is:

1. A thermostat control comprising a thermally expansible member, a leaf spring having knife edges at its ends, means bearing against said knife edges to confine said spring in bowed position so as to be snapped over center in either direction, motion transmitting means connecting said member and said spring intermediate its ends, said motion transmitting means including a lost motion construction whereby said spring is moved over center in either direction from said member after given points in the travel of the latter have been reached, and means to connect said spring to a device to be operated thereby.

2. In a device of the character described, the combination of a fuel valve and a thermostat control comprising a thermally expansible member, a leaf spring provided with knife edges at its ends, means including bearings for said knife edges holding said spring in bowed position so as to be snapped over center in either direction, motion transmitting means connecting said member and said spring intermediate each end, said motion transmitting means including a lost motion construction whereby said spring is moved over center in either direction from said member after given points in the travel of the latter have been reached, and means to connect said spring to said fuel valve.

3. A thermostat control comprising a thermally expansible member, a leaf spring provided with knife edges at its ends, means including bearing blocks for said knife edges holding said spring in bowed position so as to be snapped over center in either direction, motion transmitting means connecting said member and said spring intermediate its ends, said motion transmitting means including a lost motion construction whereby said spring is moved over center in either direction from said member after given points in the travel of the latter have been reached, and means to connect said spring to a device to be operated thereby.

4. In a device of the character described, the combination of a fuel valve and a thermostat control comprising a thermally expansible member, a leaf spring provided with knife edges at its ends, means including bearing blocks for said knife edges holding said spring in bowed position so as to be snapped over center in either direction, motion transmitting means connecting said member and said spring intermediate its ends, said motion transmitting means including an adjustable lost motion construction whereby said spring is moved over center in either direction from said member after selected points in the travel of the latter have been reached, and means to connect said spring to said valve.

5. A thermostat control comprising a thermally expansible member, a leaf spring provided with knife edges at its ends, means including bearing blocks for said knife edges holding said spring in bowed position so as to be snapped over center in either direction, motion transmitting means including a rod slidably extending through said spring intermediate its ends, abutment means on said rod on both sides of said spring to engage the latter after given movement in either direction and to move said spring over center, said motion transmitting means being connected to said member, and means to connect said spring to a device to be operated thereby.

6. In a device of the character described, the combination of a fuel valve and a thermostat control comprising a thermally expansible member, a leaf spring provided with knife edges at its ends, means including bearing blocks for said knife edges holding said spring in bowed position so as to be snapped over center in either direction, motion transmitting means including a rod slidably extending through said spring intermediate its ends, abutments on said rod disposed on both sides of said spring to engage the latter after a given movement in either direction and to move said spring over center, said transmitting means being connected to said member, and means connecting said spring to said fuel valve.

7. A thermostat control comprising a thermally expansible member, a leaf spring provided with knife edges at its ends, means including bearing blocks for said knife edges holding said spring in bowed position so as to be snapped over center in either direction, motion transmitting means including a rod slidably extending through said spring member intermediate its ends, adjustable abutments mounted on said rod on both sides of said spring to permit a lost motion of said rod with respect to said spring whereby said spring is moved over center in either direction by said rod after selected points in its travel have been reached, and means to connect said spring to a device to be operated thereby.

8. In a device of the character described, the combination of a fuel valve and a thermostat control comprising a thermally expansible member, a leaf spring provided with knife edges at its ends, means including bearing blocks for said knife edges holding said spring in bowed position so as to be snapped over center in either direction, motion transmitting means secured to said member and including a rod slidably extending through said spring intermediate its ends, said motion transmitting means including adjustable abutments disposed on both sides of said spring to provide a lost motion whereby said spring may be moved over center in either direction by said member after selected points in its travel have been reached, and means to connect said spring to said valve.

9. A thermostat control comprising a thermally expansible member, a leaf spring provided with knife edges at its ends, means including bearing blocks for said knife edges holding said spring in bowed position so as to be snapped over center in either direction, means to adjust said bearing blocks to vary the pressure upon said springs, motion transmitting means connected to said member and including a rod slidably extending through said spring intermediate its ends, adjustable abutments mounted on said rod on both sides of said spring so as to provide a lost motion whereby said spring may be moved over center in either direction by said rod after selected points in its travel have been reached, and means to connect said spring to a device to be operated thereby.

10. In a device of the character described, the combination of a fuel valve and a thermostat control comprising a thermally expansible member, a leaf spring provided with knife edges at its ends, means including bearing blocks for said knife edges holding said spring in bowed position so as to be snapped over center in either direction, means to adjust the pressure of said bearing blocks upon said spring, motion transmitting means secured to said member and including a rod slidably extending through said spring intermediate its ends, adjustable abutments mounted on said rod on both sides of said spring to provide a lost motion whereby said spring may be moved over center in either direction by said member after selected points in its travel have been reached, and means to connect said spring to said fuel valve.

11. A control comprising an actuating member, a leaf spring, adjustable means at the ends of said spring to hold the latter in bowed position so that it may be snapped over center in either direction and whereby the pressure on the ends of the spring may be varied, motion transmitting means connecting said member and said spring intermediate its ends said motion transmitting means including a connection whereby said spring is moved over center in either direction from said member after given points in the travel of the latter have been reached, and means connecting said spring to a device to be operated thereby.

12. A control comprising an actuating member, a leaf spring, adjustable means at the ends of said spring to hold the latter in bowed position so that it may be snapped over center in either direction and whereby the pressure on the ends of the spring may be varied, motion transmitting means connecting said member and said spring intermediate its ends, said motion transmitting means including an adjustable connection whereby said spring is moved over center in either direction from said member after selected points in the travel of the latter have been reached, and means to connect said spring to a device to be operated thereby.

13. A control comprising an actuating member, a leaf spring having knife edges at its ends, means bearing against said knife edges to confine said spring in bowed position so as to be snapped over center in either direction, motion transmitting means connecting said member and said spring intermediate its ends, said motion transmitting means including a lost motion construction whereby said spring is moved over center in either direction from said member after given points in the travel of the latter have been reached, and means to connect said spring to a device to be operated thereby.

14. A control comprising an actuating member, a leaf spring provided with knife edges at its ends, means including bearing blocks for said knife edges holding said spring in bowed position so as to be snapped over center in either direction, motion transmitting means connecting said member and said spring intermediate its ends, said motion transmitting means including a lost motion construction whereby said spring is moved over center in either direction from said member after giving points in its travel have been reached, and means to connect said spring to a device to be operated thereby.

15. A control comprising an actuating member, a leaf spring provided with knife edges at its ends, means including bearing blocks for said knife edges holding said spring in bowed position so as to be snapped over center in either direction, motion transmitting means including a rod slidably extending through said spring intermediate its ends, abutment means on said rod on both sides of said spring to engage the latter after given movement in either direction and to move said spring over center, said motion transmitting means being connected to said member, and means to connect said spring to a device to be operated thereby.

16. A control comprising an actuating member, a leaf spring provided with knife edges at its ends, means including bearing blocks for said knife edges holding said spring in bowed position so as to be snapped over center in either direction, motion transmitting means including a rod slidably extending through said spring member intermediate its ends, adjustable abutments mounted on said rod on both sides of said spring to permit a lost motion of said rod with respect to said spring whereby said spring is moved over center in either direction by said rod after selected points in its travel have been reached, and means to connect said spring to a device to be operated thereby.

17. A control comprising an actuating member, a leaf spring provided with knife edges at its ends, means including bearing blocks for said knife edges holding said spring in bowed position so as to be snapped over center in either direction, means to adjust said bearing blocks to vary the pressure upon said springs, motion transmitting means connected to said member and including a rod slidably extending through said spring intermediate its ends, adjustable abutments mounted on said rod on both sides of said spring so as to provide a lost motion whereby said spring may be moved over center in either direction by said rod after selected points in its travel have been reached, and means to connect said spring to a device to be operated thereby.

In witness that I claim the foregoing I have hereunto subscribed my name this 27th day of April, 1923.

OSCAR SCHWIMMER.